United States Patent [19]

Katanuma

[11] Patent Number: 4,792,707
[45] Date of Patent: Dec. 20, 1988

[54] DISK TRACKING DEVICE

[75] Inventor: Yasushi Katanuma, Furukawa, Japan

[73] Assignee: Alps Electric Co., Ltd., Japan

[21] Appl. No.: 46,029

[22] Filed: May 4, 1987

[30] Foreign Application Priority Data

Aug. 12, 1986 [JP] Japan ................... 61-187839

[51] Int. Cl.⁴ ................... H02K 33/00; G11B 21/02
[52] U.S. Cl. ................... 310/12; 310/268; 360/86; 369/49
[58] Field of Search ................ 310/12, 15, 268, 68 B, 310/208; 360/86, 97; 369/43, 44, 46, 128, 140, 49

[56] References Cited

U.S. PATENT DOCUMENTS

| | | | |
|---|---|---|---|
| 4,260,914 | 4/1981 | Hertrich | 310/15 |
| 4,366,405 | 12/1982 | Schmider | 310/268 |
| 4,613,962 | 9/1986 | Inoue et al. | 369/44 |
| 4,698,796 | 10/1987 | Kimura | 369/44 |

*Primary Examiner*—Patrick R. Salce
*Assistant Examiner*—D. L. Rebsch
*Attorney, Agent, or Firm*—Guy W. Shoup; Paul J. Winters

[57] ABSTRACT

A tracking device has a linear motor having a driving coil, a speed sensor having a detection coil, and a moving member reciprocated in a predetermined range together with the driving coil and the detection coil. The moving member receives a driving force upon application of a current to the driving coil, and the detection coil generates a signal according to the speed of the moving member. The speed sensor includes two coils connected with each other in such a direction as to phase-cancel an induced voltage due to a magnetic field generated by the driving coil; at least one of the two coils is the detection coil. The detection coil and the driving coil are arranged on one side of the moving member in a single unit.

5 Claims, 4 Drawing Sheets

DISK TRACKING DEVICE

BACKGROUND OF THE INVENTION

The present invention relates to a tracking device for moving an optical pickup block or a magnetic head, for example, with use of a linear motor.

A conventional tracking device for the optical pickup block is shown in FIG. 6. An optical pickup block 1 having an optical pickup is supported by a pair of parallel feed shafts 2 and 3 which are inserted through the block and extend in a radial direction of a compact disc, not shown. The optical pickup block 1 is slid on the feed shafts 2 and 3 in a predetermined range from an inner circumferential side of the compact disc to an outer circumferential side thereof. There are provided at both ends of the feed shafts 2 and 3 block stoppers 4 and 5 for stopping excess movement of the optical pickup block 1. Further, there are provided a linear motor 6 and a speed sensor 7 on opposing sides of the block.

The linear motor 6 comprises a yoke 8, a pair of magnets 9 and 10, a coil bobbin 11 and a driving coil 12. The yoke 8 is formed by an outer yoke portion 8a, a center yoke portion 8b and an inner yoke portion 8c, and extends in parallel relationship with the feed shafts 2 and 3. The magnets 9 and 10 are bonded to the outer yoke portion 8a and the inner yoke portion 8c, respectively, in such a manner as to be opposed to the center yoke portion 8b as shown. The coil bobbin 11 around which the driving coil 12 is wound is fixed at one end to a side of the optical pickup block 1, and is designed to freely slide on the center yoke portion 8b.

The speed sensor 7 comprises a yoke 13, a magnet 14, a coil bobbin 16 and a detection coil 17. The yoke 13 is formed by an outer yoke portion 13a and an inner yoke portion 13b. The magnet 14 is bonded to the outer yoke portion 13a as shown. The coil bobbin 16 is designed to freely slide on the inner yoke portion 13b, and is fixed at one end to an opposing side of the optical pickup block 1 in almost the same manner as with the linear motor 6.

In the aforementioned feed device, uniform magnetic fields are formed between the center yoke portion 8b of the linear motor 6 and the magnets 9 and 10. When a driving current is applied to the driving coil 12, the linear motor 6 is driven by an electromagnetic force, to thereby apply a tracking force to the optical pickup block 1. Further, a uniform magnetic field is also formed between the inner yoke portion 13b and the magnet 14, and when the optical pickup block 1 is moved a voltage is induced in the detection coil 17. Thus, the speed of the optical pickup block 1 is detected from such an induced voltage, and the speed detected is fed-back to the linear motor 6.

This kind of tracking device for the optical pickup block is disclosed in Japanese Utility Model Laid-open No. 60-47164.

However, in the conventional tracking device, when the optical pickup block 1 is stopped at a predetermined position, a high frequency component of the signal from the driving coil 12 is fed-back to the speed sensor 7. As a result, a magnetic field H is generated having a direction which is always inverted, which magnetic force H affects the detection coil 17 to induce a noise voltage. Therefore, a noise component is undesirably detected. That is, the detection coil 17 erroneously detects the noise component due to the magnetic field H, thus causing a detection error and interfering with detection of the speed signal of the optical pickup block 1.

In order to make the device compact and lightweight, it may be proposed that a common magnet and a common yoke should be used and the linear motor 6, the speed sensor 7, the driving coil 12 and the detection coil 17 should all be fixed on the same side of the optical pickup block 1. However, the influence of the magnetic field H would become pronounced, greater in this arrangement, thus increasing the noise component. Therefore, this arrangement is not practical.

SUMMARY OF THE INVENTION

It is an object of the present invention to provide a tracking device which may be made compact and lightweight.

It is another object of the present invention to provide a tracking device which may reduce a noise component detected by the detection coil.

It is a further object of the present invention to provide a tracking device which may reduce the number of parts, to reduce costs.

According to the present invention, there is provided in a tracking device including a linear motor having a driving coil, a speed sensor having a detection coil, and a moving member adapted to be reciprocated in a predetermined range, together with the driving coil and the detection coil, the moving member receiving a tracking force upon application of a driving current to the driving coil, and the detection coil generating a signal according to a speed of the moving member; an improvement characterized in that the speed sensor includes a plurality of coils connected with each other in such a direction as to cancel an induced voltage due to a magnetic field generated by the driving coil, and that at least one of the plurality of coils comprises the detection coil, and that the detection coil and the driving coil are arranged together on one side of the moving member.

With this arrangement, the plurality of coils of the speed sensor cancel the influence of the magnetic field generated by the driving coil, to thereby greatly reduce the noise component. Accordingly, even when the driving coil and the detection coil are arranged on one side of the moving member, good detection accuracy may be maintained, thereby enabling the device to be made compact and lightweight.

Other objects and features of the invention will be more fully understood from the following detailed description and appended claims when taken with the accompanying drawings.

DETAILED DESCRIPTION OF THE PREFERRED EMBODIMENTS

Figure 4:
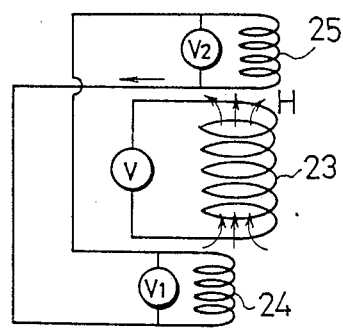
FIG. 4 is a wiring diagram of the coils.

Referring to FIGS. 1 to 4 which show a preferred embodiment of the present invention, an optical pickup block 20 slides on a feed shaft 21 extending in a radial direction of a compact disc not shown, so that it may be reciprocated in a predetermined range from an inner circumferential side of the compact disc to an outer circumferential side thereof. A coil bobbin 22, around which a plurality of coils may be wound, is fixed through a mounting member 34 to one side of the optical pickup block 20. A driving coil 23 for a linear motor is wound around a central portion of the coil bobbin 22, while a first coil 24 and a second coil 25 for a speed sensor are wound around both end portions of the coil bobbin 22. The first and second coils 24 and 25 are connected in a manner as shown in FIG. 4 with a point of symmetry therebetween located at a center of the driving coil 23.

Figure 2:
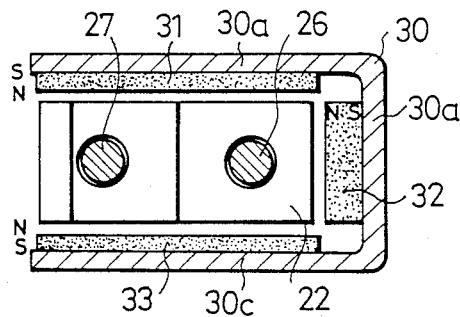
FIG. 2 is a cross-sectional view taken along the line A—A in FIG. 1.
Figure 3:
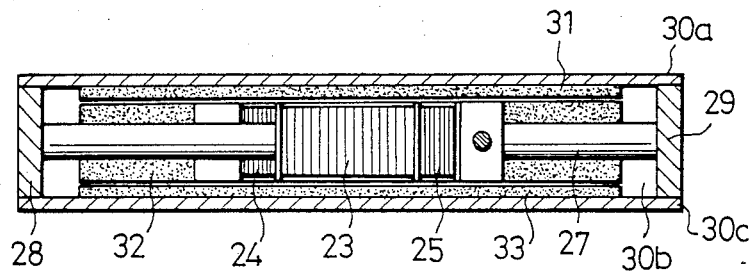
FIG. 3 is a cross-sectional view taken along the line B—B in FIG. 1.

A yoke comprises a pair of inner yoke portions 26 and 27 extending in parallel relationship with the feed shaft 21 and inserted through the coil bobbin 22, side yoke portions 28 and 29 supporting both ends of the pair of inner yoke portions 26 and 27, and an outer yoke portion 30 formed in a sectional U-shape and extending in parallel relationship with the inner yoke portions 26 and 27. The coil bobbin 22 is designed to slide freely on the inner yoke portions 26 and 27. Magnets 31, 32 and 33 oriented as shown in FIG. 2, are bonded to inner surfaces of the outer yoke portion 30.

In operation, uniform magnetic fields are formed between the inner yoke portions 26 and 27 and the upper and lower magnets 31 and 33 and between the inner yoke portion 26 and the side magnet 32. When a current is applied to the driving coil 23, a driving force is applied to the optical pickup block 20 by an electromagnetic operation. Thus, the optical pickup block 20 moves in the predetermined range, and accordingly, the first and second coils 24 and 25 cross the magnetic field, to thereby generate an induced voltage. However, as the first and second coils 24 and 25 are connected as shown in FIG. 4, induced voltages due to tandem operation of the coils 24 and 25 and the magnets 31 and 33 cancel each other, with the result that only an induced voltage due to relative motion between the first coil 24 and the side magnet 32 is supplied as a detection signal of feed speed of the optical pickup block 20. Substantially, only a part of the first coil 24 facing the side magnet 32 functions as a detection coil.

Further, when a magnetic field H, whose direction is always inverted, is generated from the driving coil 23 upon stopping of the optical pickup block 20, the first and second coils 24 and 25 generate induced voltages $V_1$ and $V_2$ in such a direction as to cancel the magnetic field H as shown in FIG. 4. However, as the coils 24 and 25 are connected in the manner shown, the induced voltages $V_1$ and $V_2$ are cancelled. Accordingly, the magnetic field H is not detected as a noise component.

Thus, the problem of noise due to the magnetic field H generated by the driving coil 23 is eliminated. Accordingly, even when the driving coil 23 for the linear motor and the first and second coils 24 and 25 for the speed sensor are arranged on one side of the optical pickup block 20 and the device is made to be compact and lightweight, detection accuracy remains good, and additionally, the number of parts may be reduced as compared with the conventional device, thereby reducing costs.

Further, the detection accuracy may be further increased by magnetically shielding the second coil 25 with a permalloy or a copper plate.

Figure 1:
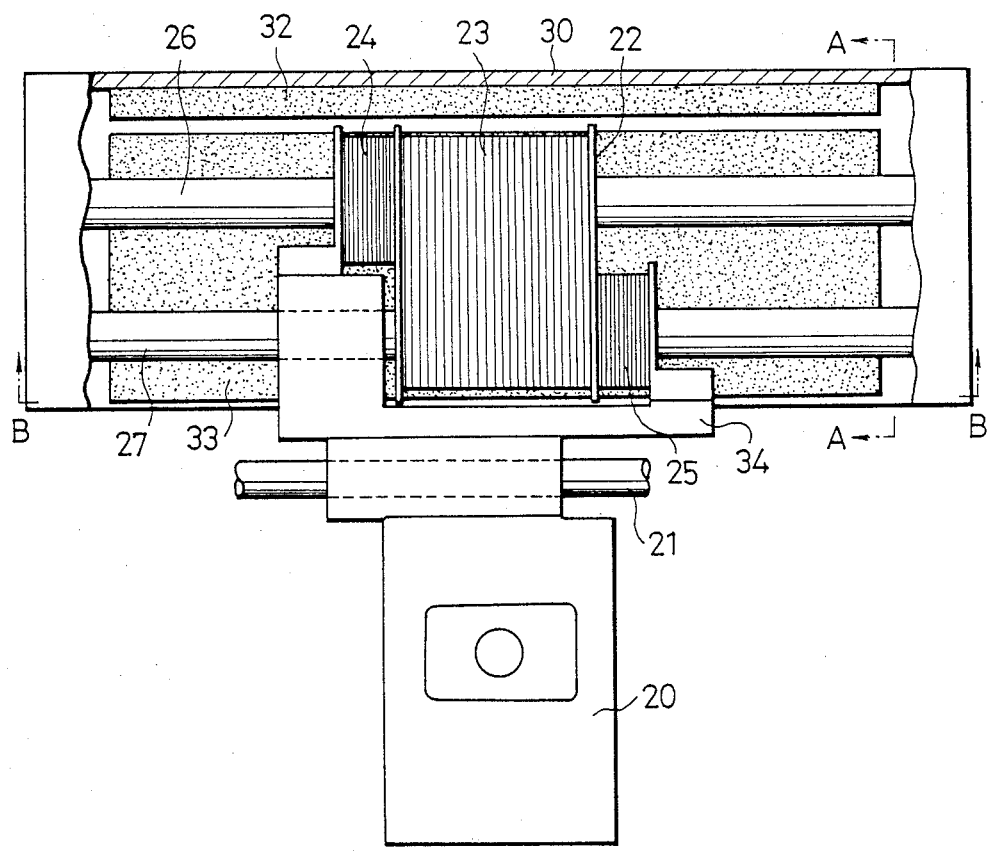
FIG. 1 is a schematic plan view of the feed device for the optical pickup block of a preferred embodiment according to the present invention.
Figure 5:
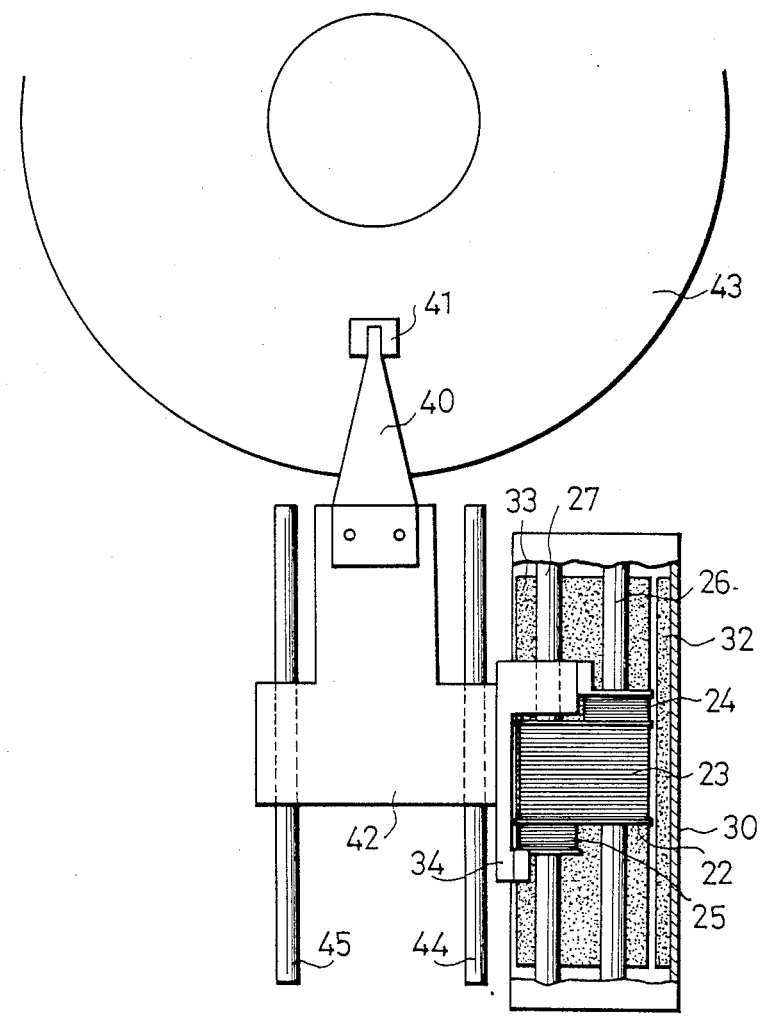
FIG. 5 is a schematic plan view of the feed device applied to a carriage mechanism.
Figure 6:
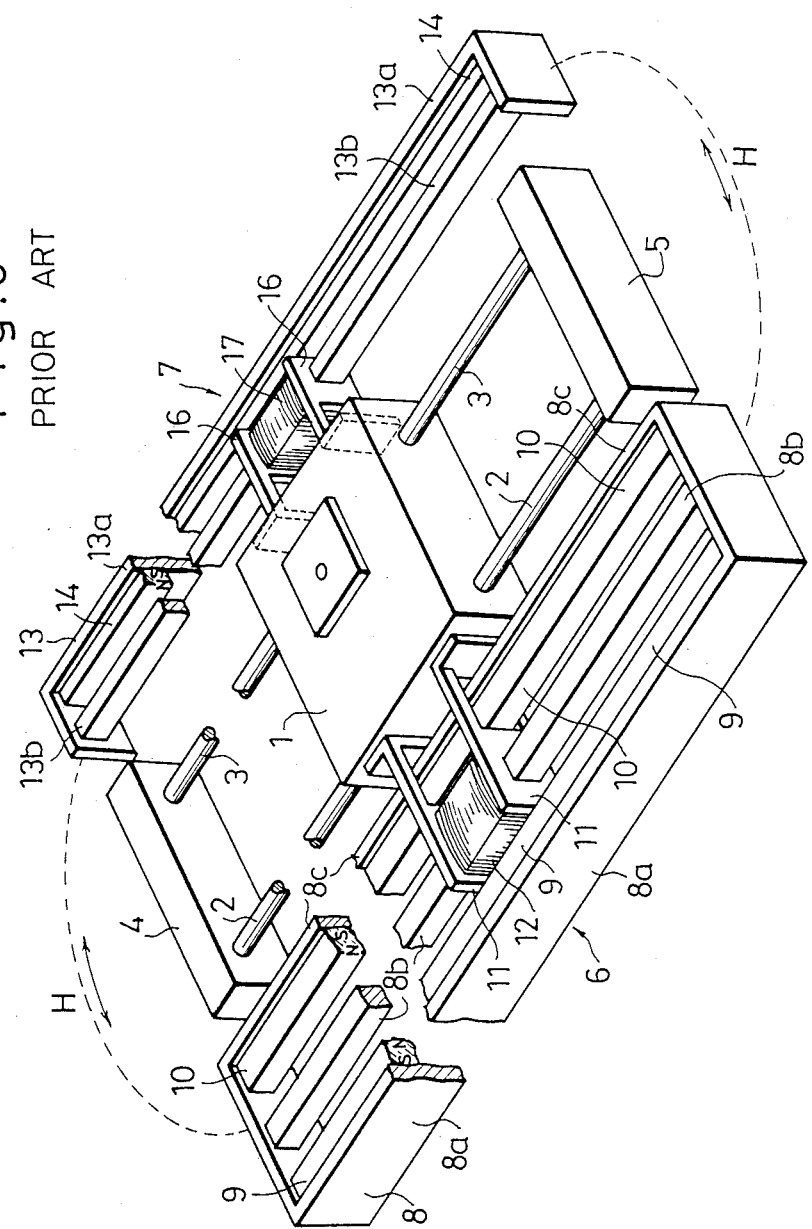
FIG. 6 is a partly broken perspective view of the feed device for the optical pickup block in the prior art.

FIG. 5 shows another embodiment of the invention adapted to a carriage feed mechanism for a magnetic disc device, wherein the corresponding parts in FIG. 1 are designated by the same reference numerals.

Referring to FIG. 5, a magnetic head 41 is mounted through a support spring 40 to a carriage 42. The carriage 42 is supported by a pair of parallel guide shafts 44 and 45 are inserted through the carriage and extend in a radial direction of a hard magnetic disc 43 in such a manner that the carriage is movable in the radial direction. A driving coil 23 and first and second coils 24 and 25 are assembled through a mounting member 34 and a coil bobbin 22 to one side of the carriage 42. Thus, a feed device similar to that disclosed in the previous embodiment is applied to the tracking mechanism for the carriage 42, to thereby make the magnetic disc device compact and lightweight.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a tracking device including a linear motor having a driving coil which is moved relative to a driving magnet extending over a predetermined range of movement of the driving coil in a longitudinal direction, a speed sensor having a detection coil which is moved relative to a detection magnet extending over said predetermined range of movement, a moving member having the driving coil fixed to one side thereof so that it can be reciprocated in the longitudinal direction over the predetermined range together with said driving coil upon application of a driving current thereto, the improvement wherein:

said detection magnet is positioned in parallel with said driving magnet on the same one side of said moving member; and said speed sensor includes first and second coils mounted on respective opposite sides of the driving coil in said longitudinal direction on said same one side of said moving member and electrically connected to each other so as to cancel any induced voltage due to a magnetic field generated by proximity to said driving magnet, wherein at least one of said first and second coils functions as said detection coil.

2. The tracking device as defined in claim 1, wherein said speed sensor includes first and second coils arranged in point symmetrical relation with said driving coil.

3. The feed device as defined in claim 1, wherein said moving member comprises an optical pickup block having an optical pickup.

4. The tracking device as defined in claim 1, wherein said moving member comprises a magnetic head carriage of a magnetic disc device.

5. A tracking device according to claim 1, wherein said first and second coils and said driving coil are wound on one coil bobbin and form a unitary structure.

* * * * *

UNITED STATES PATENT AND TRADEMARK OFFICE
CERTIFICATE OF CORRECTION

PATENT NO. : 4,792,707
DATED : December 20, 1988
INVENTOR(S) : Katanuma

It is certified that error appears in the above-identified patent and that said Letters Patent is hereby corrected as shown below:

Col. 4, line 59, delete "feed" and insert --tracking--.

<u>IN THE ABSTRACT</u>

Line 6, between "a" and "current" insert --driving--.
Line 8, delete "two" and insert --a plurality of--.
Line 10, delete "phase-cancel" and insert --cancel--.
Line 11, delete "coil;" and insert --coil,--.
Line 11, delete "two" and insert --plurality of--.
Line 12, delete "coil. The" and insert --coil, and the--.

Signed and Sealed this

Fourth Day of July, 1989

*Attest:*

DONALD J. QUIGG

*Attesting Officer*   *Commissioner of Patents and Trademarks*